United States Patent Office 2,915,684
Patented Dec. 1, 1959

2,915,684

MAGNETICALLY CONTROLLABLE SEMICON-
DUCTING RESISTANCE DEVICE AND METH-
OD OF ITS MANUFACTURE

Ottkar Halla and Friedrich Kuhrt, Nurnberg, Germany, assignors to Siemens-Schuckertwerke Aktiengesellschaft, Berlin, Germany, a corporation of Germany Application June 28, 1955, Serial No. 522,218

Claims priority, application Germany June 30, 1954

22 Claims. (Cl. 317—234)

Our invention relates to electric resistor devices of magnetically controllable resistance and, in a more particular aspect, to voltage generating semiconductor devices of the kind known as Hall-voltage generators.

It has been proposed to utilize the magnetically responsive change in resistance, observed in certain resistor bodies, as a means for measuring magnetic fields, for magnetically measuring electric currents or other current-dependent magnitudes and also for various other purposes, such as the computation of mathematical products, the electric representation of speeds of revolution, or the modulation of a carrier wave. These proposals particularly contemplate using for such purposes a resistor body formed of the recently discovered semiconducting compounds having an especially high carrier mobility, i.e., a mobility of about 6000 cm.$^2$/volt second or more, and preferably above 10,000 cm.$^2$/volt second. These compounds comprise the binary compounds of one of the elements aluminum, gallium, indium in the third group, subgroup B, of the periodic system with one of the elements phosphorus, arsenic, antimony in the fifth group, subgroup B, of the periodic system of elements. These and other semiconducting compounds of this type, briefly called $A_{III}B_V$-type compounds, are described in the copending application of Heinrich Welker, Serial No. 275,785 filed March 10, 1952 and assigned to the assignee of the present invention.

The semiconductor compounds of a carrier mobility above 6,000 cm.$^2$/volt second represent substances of unique electrical behaviour. Above all, their electric resistance exhibits a particularly pronounced dependency upon changes in an exteriorly applied magnetic field; the Hall voltage and the Hall constant are particularly high. The Hall constant is a property inherent in the substance and is the basis for the so-called Hall effect. This effect has long been known. It was first observed with metals, particularly bismuth, and consists in the phenomenon that a current-traversed resistance body, usually shaped as a wafer, exhibits a displacement of its lines of equipotential points when exposed to a magnetic field having a field component transverse to the direction of current flow. As a result of the displacement, two mutually spaced points previously at the same potential, now are at respectively different potentials, thus providing the so-called Hall voltage which can be tapped-off from two Hall electrodes mounted on the resistor body. The significance of the novel semiconductor compounds, relative to the Hall effect, resides in that they have made it possible for the first time to generate a Hall-voltage power output of such a large magnitude as to permit the direct application of the Hall voltage for the operation of ordinary moving-coil instruments as well as for the direct control of electromagnetic relays, magnetic amplifiers and other power consuming devices.

As heretofore known and disclosed, however, the magnetically controllable resistance devices and Hall generators leave much to be desired in respect to their manufacture and use in general practice, as compared with their preparation and use in the laboratory. In the first place, the resistance body of such devices, particularly if made of high-mobility semiconductor compounds, formed as a thin plate or wafer, is apt to be fragile, especially if the particular crystalline substance employed is brittle. Particularly sensitive are the places where the electrodes or electric leads are attached to the body. There is also the danger that trouble or inaccurate performance may occur, due to thermo-responsive stresses caused by non-uniform heating of the resistance body when traversed by current. It has been difficult, therefore, to produce these devices with such a slight thickness of the resistance wafer as would be best suited for the desired electrical operation, nor could such a thin-wafer device reliably be used in actual practice or under rugged operating conditions.

It is an object of our invention to obviate the above-mentioned shortcomings and to devise a manufacturing method and a product that permits the making of the resistance body of the magnetically responsive resistance device as thin as is desirable for best electrical performance, without entailing excessive difficulties in attaching the electrodes and leads during manufacture, and without rendering the device sensitive to damage or electrical trouble when in use. Indeed, it is another object of our invention to improve such devices in respect to their qualities in technical and practical use so that they can be reliably handled and are well suited for rugged operating conditions. It is also an object of our invention to facilitate mounting the resistance device and to provide a rigid and secure positioning of the electric leads so that, once the device has been balanced or calibrated for the compensation of inductive components due to variable magnetic fields, such a compensation cannot be disturbed by subsequent mounting or use of the device. Our invention further aims at providing the device with a hermetic seal against humidity and other mechanical or chemical corrosive attacks from the outside. Another object is to achieve maximum safety from trouble due to tension caused by non-uniform heating of the resistance body.

To achieve these objects, and in accordance with our invention, we embed the resistance body of a device of the above-mentioned type in a cast or molded body of a hardening or hardenable electric insulating material, preferably in a casting of synthetic resinous plastic, and we also include within the insulating material the leads and terminals or Hall electrodes connected with the resistance body. The hardened and rigid insulating enclosure is given two surfaces parallel to the broad sides of the embedded wafer. The surfaces are to be traversed by the magnetic flux to which the wafer is to be subjected; for instance, they may be engaged in face-to-face contact with the pole faces of a magnetic field structure. According to another feature of the invention, the embedded current supply or voltage-output leads are so arranged that none of them extends above one or both of the broad-side surfaces of the resistance body; and after the embedding material has hardened, the surface or surfaces of the resistance body are subjected to material-removing processing by any mechanical, chemical, electro-chemical or other method suitable for reducing the thickness of the embedded resistance body.

We are aware of the fact that transistors, that is semiconductor bodies having rectifying properties, have been embedded in plastic material for protection. In contrast thereto, our invention not only affords protection of the magnetically controllable resistance body but, by virtue of the other features mentioned in this specification, also results in considerable improvements in electrical qualities, mainly due to the fact that the embedded resistance bodies can be reduced to a thickness of a much smaller magnitude than heretofore attainable, In resistance devices that are to vary their ohmic resistance in dependence upon the magnetic field, the invention readily affords giving the resistance a high ohmic magnitude far beyond those heretofore attainable. This is an important advantage for impedance matching purposes. Furthermore, despite the reduced thickness of the resistance body, its current-carrying capacity is considerably increased in comparison with a non-embedded body, this being due to the fact that the embedding material improves the dissipation of heat from the resistance body.

In addition, Hall-voltage generators according to the invention with embedded resistance bodies of semiconducting compounds of high carrier mobility, exhibit the particularly salient advantage of being operable within a greatly increased control range.

How these objects and advantages come about will presently be explained more in detail.

The Hall voltage $U_H$ is determined by the following equation:

$$U_H = R \frac{B \cdot I_S}{d} \quad (1)$$

In this equation, R denotes the Hall constant, $d$ the thickness of the semiconducting resistance body across which the Hall voltage is generated, B the magnetic induction applied to the semiconducting resistance body, and $I_S$ the control current flowing through the body. Normally, the magnitudes B and $I_S$ represent the variable control magnitudes of the Hall generator. For any given Hall generator the maximum value of the Hall voltage $U_{Hmax}$ is attained when H and $I_S$ assume their maximum values. The maximum magnetic induction readily obtainable with the aid of the usual magnet and the like technical means is in the order of $B_{max}$—10,000 Gauss. The control current $I_S$ is more or less limited by the heat dissipation occurring during the heating of the Hall generator. The thickness $d$ of the resistance body represents a third variable in the Equation 1 for the Hall voltage $U_H$. However, as regards the dependency of the attainable maximum Hall voltage $U_{Hmax}$ upon the thickness $d$, it must be taken into account that the permissible maximum of control current $I_{Smax}$ is a function of the thickness $d$. That is, it follows from the energy balance for a Hall generator whose resistance body has a width $b$, an electric conductance $\delta$ and an effective heat transfer number $h$, that for a given permissible heating of the magnitude $\Delta T_{max}$, the maximum current $I_{Smax}$ must satisfy the equation $$I_{Smax} = b\sqrt{2\delta \Delta T_{max} \cdot h \cdot d} \quad (2)$$

It follows from Equations 1 and 2 that the maximum of attainable Hall voltage corresponds to $$U_{Hmax} = R \cdot B_{max} \cdot b \sqrt{2\delta T_{max} \frac{h}{d}} \quad (3)$$

consequently, the maximum Hall voltage increases with an increasing heat transfer number $h$ and with a decreasing thickness $d$ of the resistance body.

In view of these conditions the advantages afforded by the invention become more clearly apparent if one considers that with a semiconducting resistance body not embedded in bracing material a reduction of the thickness $d$ is possible only down to a certain limit. However, if the resistance body, according to the invention, is embedded in a protective body, it is not only possible to go considerably below the above-mentioned limit down to thickness values $d$ much smaller than those heretofore applicable, but the heat transfer number $h$ is simultaneously increased to a substantial extent so that in the foregoing Equation 3 for $U_{Hmax}$ the quotient $$\frac{h}{d}$$

is favorably modified in two respects, namely by reducing its denominator and simultaneously increasing its numerator.

The method described in the following has been found particularly favorable for embedding the resistance body. The plate- or wafer-shaped resistance body is first produced with such a sufficient thickness that the required current supply terminals and Hall electrodes, including their respective connecting leads, can be attached without difficulty, for instance by soldering and that, when making the desired connections and applying any desired inductive balancing or calibrating operation, there will be no danger of damage to the resistance body. It is preferable to embed the semiconducting resistance body with its electrodes and leads in a casting of resinous plastic. For this purpose a hardening or hardenable synthetic resin is preferably employed in which the hardening is due to polymerization. Suitable substances of this kind, for instance, are ethoxylin and polyester resins. A prepared resistance body with current-supply terminals, Hall electrodes and connecting leads is placed into a suitable mold, and the castable resin is poured into the mold in liquid condition. Subsequently, care is taken for polymerization or hardening of the resinous casting in the known manner and in accordance with the manufacturer's requirements for the particular resin used. However, other embedding methods are likewise applicable, for instance embedding of the resistor assembly into a synthetic resin powder which is subsequently liquified by heat treatment and permitted to polymerize or harden.

After the semiconducting plate or wafer of comparatively large thickness is embedded in an insulating body according to any of the methods described, and after the insulating body is hardened, the semiconductor wafer is subjected to a thickness reducing operation by chemical or mechanical removal of material until the semiconductor body has the ultimately desired thickness.

An example of the above-described method according to our invention is the following. A Hall plate is prepared from monocrystalline indium antimonide (or indium arsenide) with a length of 8 to 15 mm., a width of 3 to 8 mm. and a thickness of about 1 mm. The Hall electrodes and current leads are soldered to the plate, this being readily possible because of the relatively large thickness of the plate. The plate, electrodes and leads are then embedded as described above in a casting of polyester resin so as to form an assembly of the design described below with reference to the drawings. After hardening of the enclosure, one side of the enclosure and of the embedded body is ground down to the desired thickness such as 0.1 to 0.5 mm.

According to another feature of the invention the embedding mass for producing the protective body comprises or consists of ferrite material or a similar electrically non-conducting, magnetizable material of high permeability. According to a modification of this type, ferrite powder is used as a component of a mixture by adding it to a pourable resin or similar synthetic material. The use of such electrically insulating but magnetically conducting materials permits giving the protective body a larger thickness than otherwise applicable, because the portions of the protective body located between the magnet poles and the resistance body now have a greater magnetic conductivity and hence no longer act like an air gap. Conversely, for a given thickness of the protective body the reduced magnetic resistance results in a correspondingly higher induction to be effective within the resistance body proper. However, when thus applying a magnetically conducting material care should be taken that this material covers only those surfaces of the resistance body that extend transverse or perpendicular to the direction of the magnetic field acting upon the resistance body, thus preventing the occurrence of detrimental magnetic bridges or shortcircuits laterally around the resistance body from one to the opposite pole of the magnetic field structure.

For further describing the invention and for explaining the advantages achieved thereby, reference is made in the following to the drawings in which.

Figure 1:
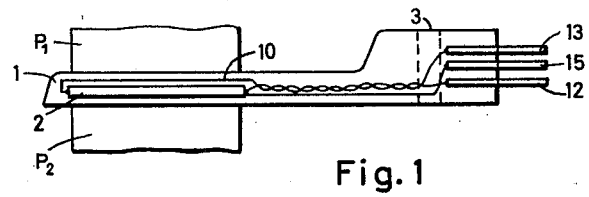
Fig. 1 shows a Hall-voltage generator according to the invention.

The same reference characters are used in the various illustrations for denoting functionally similar elements respectively. For lucid illustration it is assumed that the insulating enclosure in the illustrated embodiments is formed of transparent material, although this is not an indispensable requirement of the invention.

The embodiment illustrated in Figs. 1 to 4 is suitable for a large variety of applications. The device comprises a protective body of resinous plastic in which a wafer-shaped resistance body 2 is embedded. The resistance body 2 consists of one of the above-mentioned semiconducting materials, for instance of a monocrystalline body of indium arsenide and may be given the above-mentioned dimensions.

The protective resinous body may be looked upon as comprising two portions merging with each other, namely a portion 1 containing the resistance body 2, and a portion 3 that accommodates the electric terminals and serves as a mechanical support or mounting base.

The thickness of portion 1 of the protective body need not be larger than required for securely mounting the resistance body 2 with the terminals, electrodes and electric leads. For instance, we prefer making the portion 1 of protective body not thicker than about 1 mm. at the location where the resistance body 2 is embedded.

The resistance body 2 has two line- or area-shaped current supply terminals 4, 5 which are simply formed by the connecting leads 6, 7 themselves. The resistance body 2 is further equipped with two point-shaped Hall electrodes 8, 9 connected to respective leads 10 and 11. The Hall electrodes are located opposite each other in a direction transverse to that of the current flowing between the terminals 4 and 5. The two connecting leads 10 and 11 are twisted about each other and are connected with respective terminal lugs 12 and 13 located one above the other for attachment of respective wires by soldering. The current supply leads 6, 7 extend separately through the insulating protective body and are connected with two soldering lugs 14 and 15 respectively. The lugs 12 to 15, which may be substituted by any other terminal elements, are only partially embedded in the portion 3 of the protective body, so that the terminal ends project out of that body. Two bores 16 and 17 in portion 3 of the protective body permit mounting this body on a suitable support.

Figure 2:
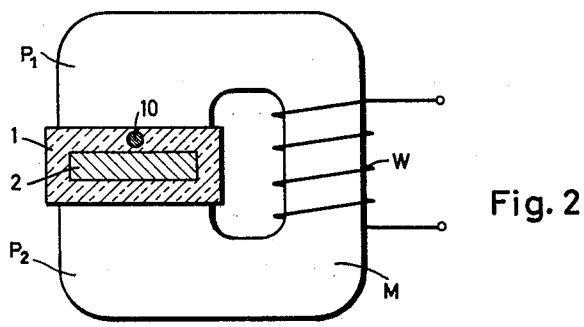
Fig. 2 is a sectional side view of the same device and includes a showing of the appertaining magnetic field system.
Figure 3:
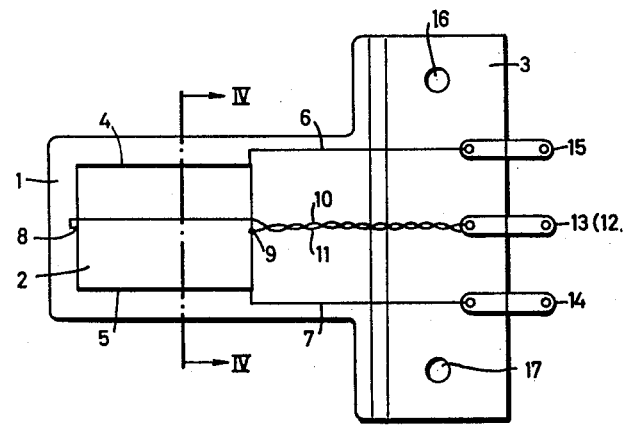
Fig. 3 is a top view of the device exclusive of the field system.
Figure 4:
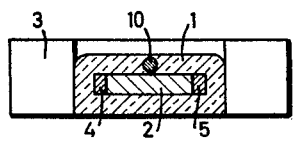
Fig. 4 is a cross section along the line IV—IV.

According to Figs. 1 and 2, the portion 1 of plastic material is inserted between the poles $P_1$ and $P_2$ of a magnet structure M. To this end, portion 1 has two planar, preferably ground surfaces, in close contact with the respective pole faces. The field of the magnet structure is produced or controlled by a winding W. The field extends through the semiconductor body 2 perpendicularly to the direction of the current flow between the terminals 4, 5 and also perpendicularly to the axis defined by the Hall point-electrodes 8 and 9. When the magnetic field strength is zero and the semiconducting resistance body 2 is traversed by current supplied through the terminals 14 and 15, then the point electrodes 8 and 9 have the same potential, that is, the voltage difference between them is zero. When the magnetic field has a finite value, due to proper excitation of winding W, then the two Hall electrodes 8 and 9 assume different potentials so that a Hall voltage is generated between them. The polarity and magnitude of the Hall voltage depends upon the polarities and magnitudes of the magnetic field and of the current, and hence can be varied by varying either or both of the controlling field and current parameters.

In the manufacture of devices according to the invention, it is important to take care that the embedded connecting leads of the resistance body are so arranged within the protective body that they do not pass over both of the resistance body surfaces that extend transverse or perpendicular to the direction of the magnetic control field to be applied. Preferably also the embedded connecting leads are so laid out that they do not pass across the plane or planes of the just-mentioned surfaces. In this manner, at least one surface of the resistance body remains freely accessible for subsequent diminution in thickness of the resistance body. As mentioned, such reduction in thickness, requiring the removal of material from the resistance body, can be effected by any suitable method, for instance by mechanical machining or chemically. We prefer to remove the material by grinding. In view of such a subsequent reduction, the embedding method can be so conducted that the portion or surface of the resistance body from which material is to be subsequently removed is not covered by the embedding mass of material. For example, the surface of the resistance body may be left projecting out of the embedding material or it may be placed flush with a neighboring surface of the protecting body.

In some cases, the subsequent removal of material from the resistance body may have the effect of releasing inherent mechanical tensions, and this may damage or destroy the resistance body. Such occurrences, however, can be avoided by employing suitable expedients to prevent such mechanical tensions. For instance, the resistance body may be subjected to normalizing treatment by applying elevated temperature, similar to the heating or annealing generally applied to castings for the same purpose of eliminating interior tension. Good results have been obtained by slowly cooling the resistance body from the hardening temperature down to the normal use temperature of the resistance body. However, we generally prefer making certain from the outset that interior mechanical tensions do not occur. This can be achieved, for instance, by employing synthetic resins of corresponding properties. Of course, any such means for eliminating interior tension are not necessary in cases where the semiconductor substance is not brittle and fragile but has sufficient elasticity to obviate damage of the kind mentioned.

Figure 5:
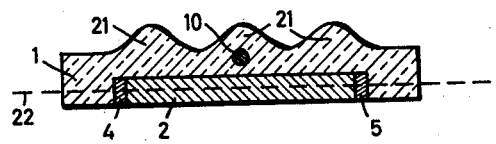
Figs. 5 and 6 are explanatory of a manufacturing method according to the invention and show, in cross section, the same Hall-generator device in two stages of manufacture respectively.
Figure 6:
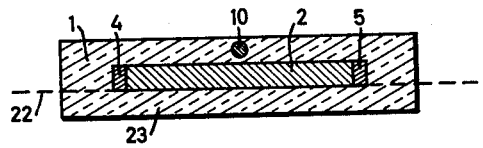

For preventing destruction or damage of the embedded resistance body due to subsequent removal of material therefrom, the following method, described with reference to Figs. 5 and 6, has also been found of advantage in cases where brittle semiconducting materials are involved. When producing the protective enclosure around the resistance body, the enclosure 1 is at first provided with bracing ribs 21 on the side opposite to the side of the resistance body 2 to be subjected to subsequent machining or other removal of material. Upon hardening of the enclosure 1, the resistance body 2 is reduced to the desired thickness, preferably by grinding down to the dashed line 22 in Fig. 5. Thereafter the machined surface of the resistance body is again enclosed by casting resinous material upon it, so that the newly cast material 23 (in Fig. 6) merges with the rest of the protective body. Subsequently, the bracing ribs 21 located on the other side of the protective body are removed, for instance also by grinding, so that the device has the final cross-sectional shape shown in Fig. 6. The subsequent covering of the machined surface of the resistance body has also the advantage of securing an increased dissipation of heat from that surface.

Another way of preventing damage or destruction of the embedded resistance body due to the release of internal mechanical tensions is to place the resistance body with the surface not to be machined onto a plastically deformable support so that this plastic support is located between the resistance body and the surrounding enclosure 3.

Figure 7:
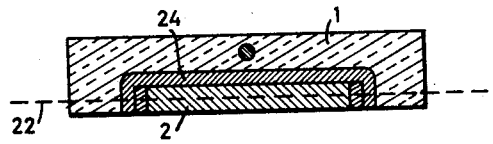
Fig. 7 is a cross-sectional view of another Hall-generator device according to the invention.

Thus, according to Fig. 7, the semiconductor body 2 is placed against a plate or wafer 24 of elastomer material such as rubber or a synthetic elastomer, and the elastic wafer 24 is embedded into the rigid plastic of enclosure 1 together with the body 2. As shown, the elastic plate 24 may cover not only the top surface of body 2 but may also reach around its narrow sides. After hardening of enclosure 1, the body 2 is subjected to grinding to reduce its thickness down to the dashed line 22. During grinding, the elastomer material 24 absorbs shocks thus protecting the body 2. If desired, the machined and exposed surface of body 2 may be subsequently covered as described above.

Figure 9:
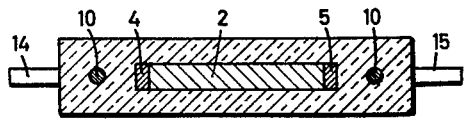
Fig. 9 shows a cross section along the line IX—IX in Fig. 8.
Figure 8:
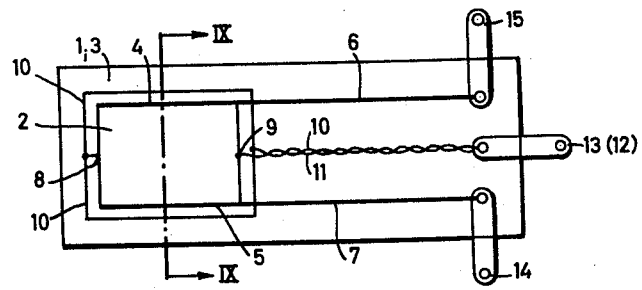
Fig. 8 is a top view of still another embodiment.

While in the embodiment according to Figs. 1 to 4 only one surface of the resistance body is readily accessible for the subsequent removal of material, the embodiment shown in Figs. 8 and 9 has both magnetic-flux traversed surfaces freely available for reduction in thickness. For this purpose the lead 10 connected to the Hall electrode 8 is subdivided into two branches which are laterally laid about the narrow faces of the resistance body 2 and are thereafter again united to a single lead. Such a balanced subdivision into two branches need not be used if no appreciable disturbance is to be expected from any component effect occurring in the circuit of the Hall electrodes due to the application of a magnetic field varying with time.

To attain the largest possible heat dissipation from the resistance body, the embedding is preferably made of a good heat conducting material. The heat conductance of the material can be further increased by adding to the resinous or other material to be cast or molded an amount of quartz meal or electrically non-conducting substances, for instance metal oxides.

The heat dissipation by thermal conductance of the enclosing material and the resulting improvement in properties of the device according to the invention, however, can also be increased by externally applied means. Thus, according to a modification of the invention, the protective enclosure is made longer than the embedded resistance body beyond the extent required for embedding the body. This is particularly effective if the enclosure consists of a material of high thermal conductance. According to another feature serving the same purpose, cooling vanes or similar heat conducting elements are embedded in the enclosure. For obtaining a slight overall thickness of the protective enclosure, these heat conducting vanes or other means are made to project out of the protective body at its narrow sides. The cooling vanes or other heat conducting members may be so designed or arranged that they dissipate heat to an adjoining object. Particularly suitable for dissipating the heat by conductance is the magnetic core of the magnetic field structure used for exciting the resistance body. This is the reason why it is particularly advantageous to place the surface of the protective body directly in intimate face-to-face contact with the pole faces of the magnetic field structure to whose field the resistance body is to be subjected. In this manner a particularly large heat dissipation by conductance is secured. A particularly effective heat conductance is further attained by inserting, preferably casting, a thermal contact mass between the protective body and the pole faces of the magnetic field structure.

Figure 10:
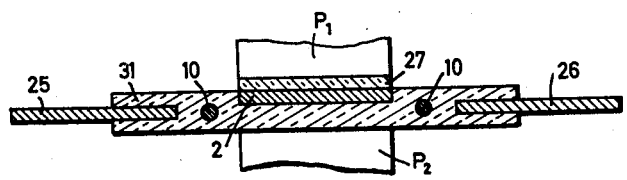
Fig. 10 is a cross section of a further embodiment according to the invention.

The Hall generator illustrated in Fig. 10 embodies the modifications just described. The semiconducting resistor body 2 of this device is embedded in a rigid enclosure 31 of much greater length than needed for the embedding proper. The enclosure is formed of polyester resin or a similar synthetic plastic mixed with quartz meal. Two cooling vanes 25, 26 are also embedded and project out of the enclosure 31. The resistor body 2 has its upper surface flush with the top surface of the enclosure. The lower surface of enclosure 31 is in intimate, heat-conducting contact with the face of pole piece $P_2$ of the magnet (see M in Fig. 2). A layer 27 of heat-conducting electrically insulating material is cast into the space between the body 2 and the face of pole piece $P_1$. Layer 27 may consist of a mixture of ferrite powder with a synthetic plastic to secure not only a good heat transfer from body 2 to pole piece $P_1$ but also a good magnetic connection.

Figure 11:
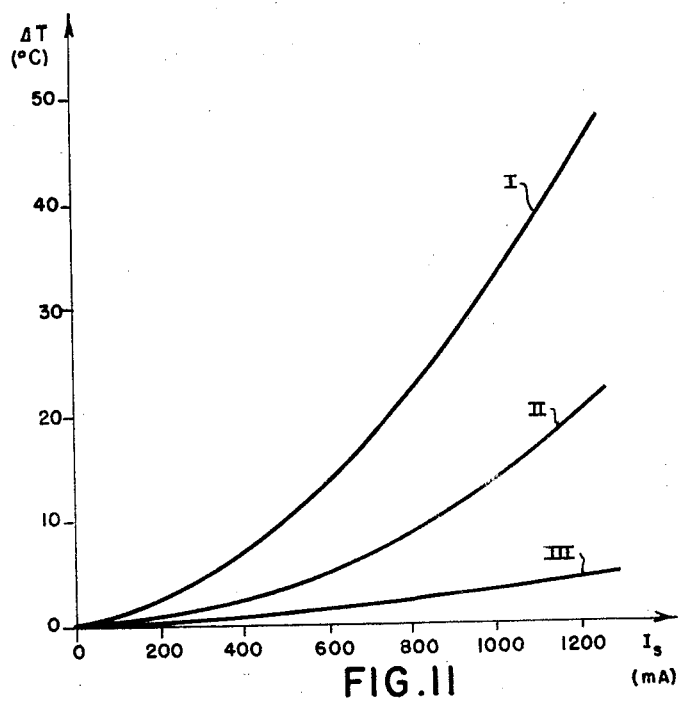
Figs. 11 and 12 are coordinate diagrams explanatory of the operation of Hall-voltage generators according to the invention.
Figure 12:
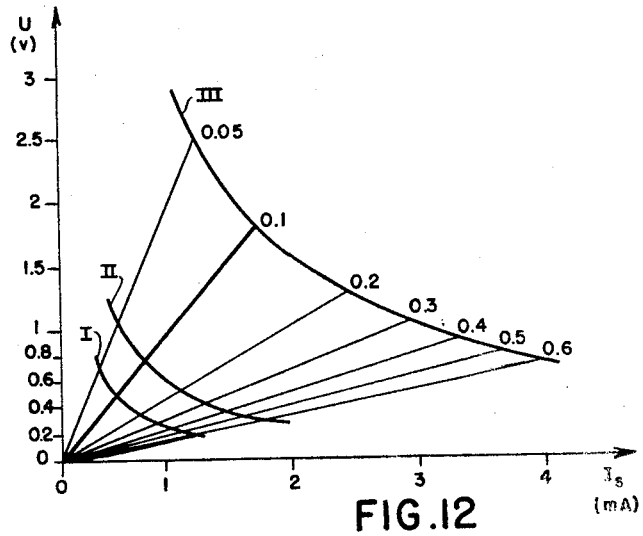

The considerable improvement achieved by virtue of the invention will be more fully understood from the graphs presented in Figs. 11 and 12.

Fig. 11 indicates the measured temperature increase $\Delta T$ of a resistance body formed of indium arsenide versus the controlling current $I_S$ flowing through the body. The temperature curves were obtained with a length and width in the order of magnitude of a few millimeters, and a thickness in the order of magnitude of a few one-tenths of a millimeter. The curves shown on the diagram, in harmony with the above presented equations, follow the square-law dependency expressed by:

$$I_S^2 = 2b^2 \cdot h \cdot d \cdot \Delta T \qquad (4)$$

Curve I applies to the resistance body when not embedded but operating in air. Curve II applies to the specimen embedded in a protective body of a cast resin operating in air. Curve III applies to a specimen embedded in a cast body of resin operated in intimate face-to-face contact with the pole faces of the appertaining magnetic field structure. As can be seen from a comparison of the three curves, the heat transfer number in case II is about 2.5 times as large, and in case III about 15 times as large as the heat transfer number of the unenclosed resistance body in air.

The resulting improvement of the Hall-generator operation is apparent from the diagram of Fig. 12 which is based upon a resistance body of substantially the same dimensions as mentioned above with reference to Fig. 11. Fig. 12 indicates the dependency of the Hall voltage $U_H$ upon the control current $I_S$, a constant magnetic field being applied to the resistance body. The straight lines entered into the diagram apply respectively to the values of thickness of the resistance body indicated in millimeters next to the respective lines. The hyperbolic curves I, II and III represent the limit curves up to which the resistance body can be controlled without detriment to its desired properties. As in Fig. 11, curve I in Fig. 12 applies to the non-embedded resistance body, curve II to the embedded resistance body, and curve III to the embedded resistance body in intimate contact with the two pole shoes of the appertaining magnetic field structure.

The curves I to III are based upon a given permissible maximum increase in temperature. The curves manifest a considerable widening of the control range of the Hall generator as well as an increase in Hall voltage, this voltage increase being due to the fact that the embedding of the resistance body permitted grinding its thickness down to that of a thin wafer. The increase in Hall voltage is particularly apparent from a study of the two linear characteristics shown by heavy lines. The lower straight line represents the relation between the Hall voltage $U_H$ and the control current $I_S$ as well as the utilizable control range for the non-embedded resistance body used in the manner heretofore known, whereas the upper straight line applies to a specimen embedded in a protective body according to the invention and ground down to a thickness of 0.1 mm.

Another advantage afforded by the reduction in thickness of the resistance body is the increase in the interior resistance $R_i$ effective within the circuit of the Hall electrodes. This is important for many applications where impedance matching or similar adaptations are desired or necessary. For instance, if the Hall generator is to be used for the control of a magnetic amplifier it is much easier to design a magnetic amplifier having an input circuit matched to a resistance of approximately 10 ohms rather than to a resistance of only about 1 ohm or less.

As can be shown in calculation, the maximum attainable power output in the Hall-voltage generating circuit of a semiconducting resistance body is proportional to the effective heat transfer number $h$. In the above mentioned examples, therefore, the further advantage of increasing the power output by the factor 2.5 and 15 respectively is achieved.

Relative to the data mentioned with reference to Figs. 11 and 12 it may be added that these data by no means represent highest attainable values. By application of the further, above-mentioned improvements, for instance by the use of a resinous casting admixed with quartz meal or the like, a further increase in the desired properties is obtained. As above mentioned, the data apparent from Figs. 11 and 12 apply to a resistance body of given dimensions and consist of a given semiconducting compound, namely, indium arsenide, having a Hall constant R in the order of magnitude of about 120 cm./amp. sec. Similar and in part better results are obtainable with resistance bodies of different semi-conducting compounds.

The term "high carrier mobility," as employed herein, means a mobility of at least about 6000 cm.$^2$/volt second.

While we have shown and described particular embodiments of our invention, it will occur to those skilled in the art that various changes and modifications may be made without departing from the invention. We therefore aim in the appended claims to cover all such changes and modifications as fall within the true spirit and scope of our invention.

We claim:

1. A Hall effect resistance device for controlling electric current flow as a function of magnetic field strength, comprising a plate-shaped semiconductor member comprised of a binary compound of high carrier mobility, current supply and Hall voltage electric conductor means joined with said member, and an electrically insulating and supporting structure comprising a first portion within which said member and said conductor means are embedded, and which is only slightly greater in thickness than the thickness of said member, and a second portion integral with said first portion and of substantially greater thickness than the thickness of said first portion, said second portion compriing means for mounting said supporting structure and for electrical connection to said conductor means.

2. A Hall effect resistance device for controlling electric current flow as a function of magnetic field strength, comprising a plate-shaped semiconductor member having opposed wide area surfaces and comprised of a binary compound of high carrier mobility, electric conductor means joined with said member, a substantially rigid, heat conductive electrically insulating covering of plastic in which said member and said conductor means are embedded, said embedded conductor means comprising a first pair of wires for deriving Hall voltage from said member and a pair of wires for passing current through said member, one conductor of said first pair being divided into two parts which surround the periphery of said member and join together again as a single conductor.

3. A Hall effect resistance device for controlling electric current flow as a function of magnetic field strength, comprising a plate-shaped semiconductor member comprised of a binary compound of high carrier mobility, current supply and Hall voltage electric conductor means joined with said member, a substantially rigid, electrically insulating covering of plastic in which said member and said conductor means are embedded, and terminal connector means joined with said electric conductor means and having connector lug elements projecting from said insulating covering, said insulating covering being provided with a material imparting high thermal conductvity.

4. A Hall effect resistance device for controlling electric current flow as a function of magnetic field strength, comprising a plate-shaped semiconductor member comprised of a binary compound of high carrier mobility, current supply and Hall voltage electric conductor means joined with said member, a substantially rigid, electrically insulating covering of plastic in which said member and said conductor means are embedded, and terminal connector means joined with said electric conductor means and having connector elements projecting from said insulating covering, said insulating covering being provided with heat-radiating fins embedded in and projecting from the narrow edges of said covering.

5. A Hall effect resistance device for controlling electric current flow as a function of magnetic field strength, comprising a plate-shaped semiconductor member comprised of a binary compound of high carrier mobility, current supply and Hall voltage electric conductor means joined with said member, a substantially rigid, heat conductive electrically-insulating covering comprising plastic in which said member and said conductor means are embedded, terminal connector means joined with said electric conductor means and having connector elements projecting from said insulating covering, and an electromagnet having opposed pole shoes and being disposed with respect to said embedded member so as to pass a magnetic field perpendicular to the planar surfaces thereof, wherein at least one of the covering surfaces is parallel to one of the major planar surfaces of said member and is in direct contact with one of said pole shoes, whereby a high rate of conductive heat dissipation to said electromagnet is effected.

6. A Hall effect resistance device for controlling electric current flow as a function of magnetic field strength, comprising a plate-shaped semiconductor member comprised of a binary compound of high carrier mobility, current supply and Hall voltage electric conductor means joined with said member, a substantially rigid, electrically-insulating covering comprising plastic in which said member and said conductor means are partly embedded, one of the major planar surfaces of the member being exposed, terminal connector means joined with said electric conductor means and having connector elements projecting from said insulating covering, and an electromagnet having opposed pole shoes and being disposed with respect to said embedded member so as to pass a magnetic field perpendicular to the planar surfaces thereof, wherein the covering surface of plastic is parallel to one of the major planar surfaces of said member, a thermally conductive electrically insulating plastic mass disposed between said exposed surface and its respective pole shoe for dissipating heat to said electro-magnet through said mass.

7. The method of producing a Hall effect electric resistance device of magnetically responsive resistance, which comprises joining current supply and Hall voltage electric conductor means with a flat resistance body of a semiconducting compound of high carrier mobility and arranging said conductor means so that at least one wide area surface of said body is left unobstructed, molding an electrically insulating and hardenable plastic material about said body and said means whereby, upon hardening of said material, said body and said means are rigidly embedded in said material, and removing substance from said unobstructed surface of said body to reduce the thickness of said body.

8. The method of producing a Hall effect device for controlling electric current flow as a function of magnetic field strength, which comprises connecting current supply and Hall voltage electrical conductors with a Hall plate comprised of a binary compound of high carrier mobility, arranging said conductors so that at least one Hall surface of said plate remains unobstructed, molding an electrically nonconductive and hardenable material of plastic about said plate and said conductors, cutting away layers of said hardenable material after hardening together with layers of said one of said Hall surfaces to reduce the thickness of said Hall plate, and finally covering said cut-away Hall surface with resinous material.

9. The method of producing a Hall effect device for controlling electric current flow as a function of magnetic field strength, which comprises connecting current supply and Hall voltage electrical conductors with a Hall plate comprised of a semiconductor of high carrier mobility, arranging said conductors so that at least one Hall surface of said plate remains unobstructed, molding an electrically nonconductive and hardenable supporting member of plastic about said plate and said conductors, said supporting member being molded with strengthening ribs at the side of one of the Hall surfaces of said Hall plate, cutting away layers of said hardenable material after hardening together with layers of the other of said Hall surfaces to reduce the thickness of said Hall plate, covering said cut-away Hall surface with a resinous material, and finally cutting away said molded strengthening ribs to reduce said covering structure at said first-mentioned Hall surface.

10. The method of producing a Hall effect device for controlling electric current flow as a function of magnetic field strength which comprises connecting electrical conductors with a Hall plate comprised of a binary compound of high carrier mobility, arranging said conductors so that at least one Hall surface of said plate remains unobstructed, embedding one Hall surface and the peripheral edges of said Hall plate in a layer of electrically non-conductive resilient material, molding an electrically nonconductive and hardenable material of plastic about said resilient material and said conductors, and finally cutting away said hardenable material together with layers of the other of said Hall surfaces to reduce the thickness of said Hall plate.

11. A Hall-effect apparatus comprising a semiconductor plate having opposite wide area faces and a perimetric area, protective support means for the plate comprising an electrically insulating hardened plastic material embedding at least one of said faces, the thickness of the plastic thereon being not more than one mm., and also encasing a perimetric area of the plate, means comprising magnet poles for imposing magnetic flux across said wide area faces, the plate being located between the poles, at least one of said poles being in direct heat exchange with said hardened plastic material on one of said faces, electrical insulating means interposed between the other pole and the other of said faces, said plate having Hall voltage terminals and current supply terminals, leads connected to said terminals, the leads being in part embedded in said hardened plastic material and in part extended outwardly therefrom.

12. A Hall-effect apparatus comprising a semiconductor plate having opposite wide area faces and a perimetric area, protective support means for the plate comprising an electrically insulating hardened plastic material embedding at least one of said faces, the thickness of the plastic thereon being not more than one mm., and also encasing a perimetric area of the plate, means comprising magnet poles for imposing magnetic flux across said wide area faces, the plate being located between the poles, at least one of said poles being in direct heat exchange with said hardened plastic material on one of said faces, electrical insulating means interposed between the other pole and the other of said faces, said plate having Hall voltage terminals and current supply terminals, leads connected to said terminals, the leads being in part embedded in said hardened plastic material and in part extending outwardly therefrom, the embedded part of the leads connected to the Hall terminals being brought together and entwined about each other.

13. A Hall-effect apparatus comprising a semi-conductor plate having opposite wide area faces and a perimetric area, protective support means for the plate comprising an electrically insulating hardened plastic material embedding at least one of said faces, the thickness of the plastic thereon being not more than one mm., and also encasing a perimetric area of the plate, an elastomer sheet interposed between the hardened plastic sheet and the said one face, means comprising magnet poles for imposing magnetic flux across said wide area faces, the plate being located between the poles, at least one of said poles being in direct heat exchange with said hardened plastic material on one of said faces, electrical insulating means interposed between the other pole and the other of said faces, said plate having Hall voltage terminals and current supply terminals, leads connected to said terminals, the leads being in part embedded in said hardened plastic material and in part extended outwardly therefrom.

14. A Hall-effect apparatus comprising a semi-conductor plate having opposite wide area faces and a perimetric surface area, protective support means for the plate comprising an electrically insulating heat-conducting hardened plastic material embedding all of said plate, means comprising magnet poles for imposing magnetic flux across said wide area faces, said poles being in direct contact with said hardened plastic material on said faces, said plate having Hall voltage terminals and current supply terminals, leads connected to said terminals, the leads being in part embedded in said hardened plastic material and in part extended outwardly therefrom.

15. A Hall-effect apparatus comprising a semi-conductor plate having opposite wide area faces and a perimetric surface area, protective support means for the plate comprising an electrically insulating heat-conducting hardened plastic material embedding all of said plate, means comprising magnet poles for imposing magnetic flux across said wide area faces, said poles being in direct contact with said hardened plastic material on said faces, said plate having Hall voltage terminals and current supply terminals, leads connected to said terminals, the leads being in part embedded in said hardened plastic material and in part extended outwardly therefrom, said plastic material having embedded therein a heat conductance increasing powder.

16. A Hall-effect apparatus comprising a semi-conductor plate having opposite wide area faces and a perimetric surface area, protective support means for the plate comprising an electrically insulating heat-conducting hardened plastic material embedding all of said plate, means comprising magnet poles for imposing magnetic flux across said wide area faces, said poles being in direct contact with said hardened plastic material on said faces, said plate having Hall voltage terminals and current supply terminals, leads connected to said terminals, the leads being in part embedded in said hardened plastic material and in part extended outwardly therefrom, said plastic material having an admixture of a magnetic ferrite to increase the heat conductivity and the magnetic induction.

17. A Hall-effect apparatus comprising a semi-conductor plate having opposite wide area faces and a perimetric area, protective support means for the plate comprising an electrically insulating heat conducting hardened plastic material embedding at least one of said faces, the thickness of the platic thereon being not more than one mm., and also encasing a perimetric area of the plate, means comprising magnet poles for imposing magnetic flux across said wide area faces, the plate being located between the poles, at least one of said poles being in direct heat exchange with said hardened plastic material on one of said faces, electrical insulating heat conducting means interposed between the other pole and the other of said faces, said plate having Hall voltage terminals and current supply terminals, leads connected to said terminals, the leads being in part embedded in said hardened plastic material and in part extended outwardly therefrom.

18. A Hall-effect electric resistance device of magnetically controllable resistance, comprising a resistance plate of magnetically responsive substance formed of a semiconducting compound of a carrier mobility of at least about 6,000 cm.$^2$/volt second, said plate having opposite wide area faces and a thickness of not more than about 0.1 mm., said plate having Hall voltage terminals and current supply terminals, electric conductor leads connected to said terminals, and a rigid enclosure of hardened electrically insulating material of plastic in which said plate and the connected part of the leads are embedded, said enclosure having two parallel faces to be traversed by magnetic flux when said device is in operation, said enclosure faces extending parallel to said plate faces on both respective sides thereof and being not more than about one mm. thick, said leads and terminals being so located as to leave free one of the wide area faces of the plate to permit the grinding of the corresponding face of the plastic to reduce its thickness, heat conductive vanes connected to said plastic, and heat conductive powder distributed in said plastic.

19. A Hall generator capable of generating a Hall-voltage power output of such large magnitude as to permit the direct application of the Hall voltage for the operation of ordinary moving-coil instruments, and for direct control of electromagnetic relays, magnetic amplifiers, and other power consuming devices, comprising a resistance body of magnetically responsive substance formed of an $A_{III}B_V$ semiconducting compound of a carrier mobility of at least about 10,000 cm.$^2$/volt second, said body having wide area flat faces, current supply and Hall voltage electric conductor means joined with said body, and a rigid casting of an electrically insulating plastic embedding said body and said conductor means, said conductor means being so located as to leave at least one of the flat surfaces of said body unobstructed, pole means for imposing magnetic flux across said wide area faces, said casting having two faces traversed by the magnetic flux when in operation and extending parallel to said wide area faces on both respective sides thereof and having a thickness on said sides of not more than one mm., the said electrically insulating material containing distributed therein an electrically nonconductive heat conductive material to enhance its heat conductance.

20. A Hall effect resistance apparatus for controlling electric current flow as a function of magnetic field strength, the apparatus constituting a generator capable of generating a Hall-voltage power output of such large magnitude as to permit the direct application of the Hall voltage for the operation of ordinary moving-coil instruments, and for direct control of electromagnetic relays, magnetic amplifiers, and other power consuming devices, and comprising a plate-shaped semiconductor member comprised of an $A_{III}B_V$ binary compound having a carrier mobility of at least about 10,000 cm.$^2$/volt second, current supply and Hall voltage electric conductor means joined with said member, and an electrically insulating and supporting structure of plastic and comprising a first portion within which said conductor means and all faces of said member are embedded, and which is only slightly greater in thickness than the thickness of said member, and a second portion integral with said first portion and of substantially greater thickness than the thickness of said first portion, said second portion comprising means for mounting said supporting structure, electrical connections to said conductor means mounted on said second portion, magnetic pole means juxtaposed in relation to said first portion to impose magnetic flux across its thickness, heat conductive means at least partially embedded in said plastic.

21. A Hall effect resistance apparatus for controlling electric current flow as a function of magnetic field strength, and providing a generator capable of generating a Hall-voltage power output of such large magnitude as to permit the direct application of the Hall voltage for the operation of ordinary moving-coil instruments, and for direct control of electromagnetic relays, magnetic amplifiers, and other power consuming devices, the apparatus comprising a plate-shaped semiconductor member composed of an $A_{III}B_V$ binary compound having a carrier mobility of at least 10,000 cm.$^2$/volt second, current supply and Hall voltage electric conductor means joined with said member, and a substantially rigid, electrically insulating covering of plastic in which said conductor means and the periphery and at least one planar face of the member are embedded, the covering upon a planar face of said plate-shaped member being no greater than about 1 mm. in thickness, and heat conductive means at least partly embedded in said plastic.

22. The apparatus of claim 19, the heat conductive material comprising a magnetic ferrite substantially restricted to a part of the plastic between the pole means.

References Cited in the file of this patent

UNITED STATES PATENTS

| | | |
|---|---|---|
| 2,586,609 | Burke | Feb. 19, 1952 |
| 2,594,939 | Leete | Apr. 29, 1952 |
| 2,719,253 | Willardson et al. | Sept. 27, 1955 |
| 2,725,504 | Dunlap | Nov. 29, 1955 |

UNITED STATES PATENT OFFICE

CERTIFICATE OF CORRECTION

Patent No. 2,915,684　　　　　　　　　　December 1, 1959

Ottokar Halla et al.

It is hereby certified that error appears in the above numbered patent requiring correction and that the said Letters Patent should read as corrected below.

In the grant, line 1, and in the heading to the printed specification, line 5, name of first inventor, for "Ottkar Halla", each occurrence, read -- Ottokar Halla --.

Signed and sealed this 21st day of June 1960.

(SEAL)
Attest:

KARL H. AXLINE
Attesting Officer

ROBERT C. WATSON
Commissioner of Patents